United States Patent [19]

Kreymer

[11] Patent Number: 5,715,701
[45] Date of Patent: Feb. 10, 1998

[54] DOUBLE BLOWER AIR CONDITIONING UNIT

[75] Inventor: Naum Kreymer, Ogden, Utah

[73] Assignee: FMC Corporation, Chicago, Ill.

[21] Appl. No.: 724,451

[22] Filed: Oct. 1, 1996

[51] Int. Cl.⁶ ................................. B64D 13/08
[52] U.S. Cl. ................ 62/419; 454/76; 454/119
[58] Field of Search ............... 454/76, 119, 338; 62/419

[56] References Cited

U.S. PATENT DOCUMENTS

| | | |
|---|---|---|
| 2,708,867 | 5/1955 | Turner, Jr. .................. 454/119 |
| 3,988,900 | 11/1976 | Kamata et al. ............. 62/419 X |
| 4,462,460 | 7/1984 | Braver . |
| 4,741,178 | 5/1988 | Fujui .......................... 62/525 |
| 4,926,649 | 5/1990 | Martinez, Jr. .............. 62/99 |
| 5,205,130 | 4/1993 | Pannell ...................... 62/236 |
| 5,333,768 | 8/1994 | Mellum et al. ............ 62/236 X |
| 5,356,337 | 10/1994 | Dauvegne .................. 454/156 |
| 5,467,606 | 11/1995 | Sasaki et al. .............. 454/329 X |

*Primary Examiner*—Harold Joyce
*Attorney, Agent, or Firm*—Michael Lee

[57] ABSTRACT

A method and apparatus for providing conditioned air to an aircraft parked at an airport. The air conditioning unit is able to accommodate various aircraft sizes. The unit uses two blowers to allow an increase in variation in the volume of air supplied without changing the static pressure of the air supplied. The unit also uses dampers to accommodate aircraft with one and two air hose connections.

10 Claims, 3 Drawing Sheets

DOUBLE BLOWER AIR CONDITIONING UNIT

BACKGROUND OF THE INVENTION

At airports, while an aircraft is parked at a passenger boarding bridge, an aircraft is it is difficult for the aircraft to maintain the aircraft's cabin temperature, since the engines of the aircraft are not running. It is desirable to provide conditioned air from a source outside of the aircraft. It is desirable that the conditioned air is sufficient for the wide variety of aircraft. A narrow body aircraft may require as low as 120 pounds/minute of conditioned air, with wide body aircraft requiring more, and jumbo body aircraft requiring as much as 500 pounds/minute of conditioned air. The static pressure required to convey this air to the aircraft over this broad range of air flow, should vary in a significantly smaller amount than this broad range of air flow. A single conventional blower in an air conditioning unit would require a complex and expensive system to provide such an air flow versus static pressure performance.

SUMMARY OF THE INVENTION

It is an object of the invention to provide sufficient amounts of conditioned air to a variety of aircraft sizes by cooling, heating, air moving means, which is a single air conditioning unit.

BRIEF DESCRIPTION OF THE DRAWINGS

FIG. 4 is a view of a remote control of the air conditioning unit mounted on the column of a passenger boarding bridge control panel.

DESCRIPTION OF THE PREFERRED EMBODIMENTS

Figure 1:
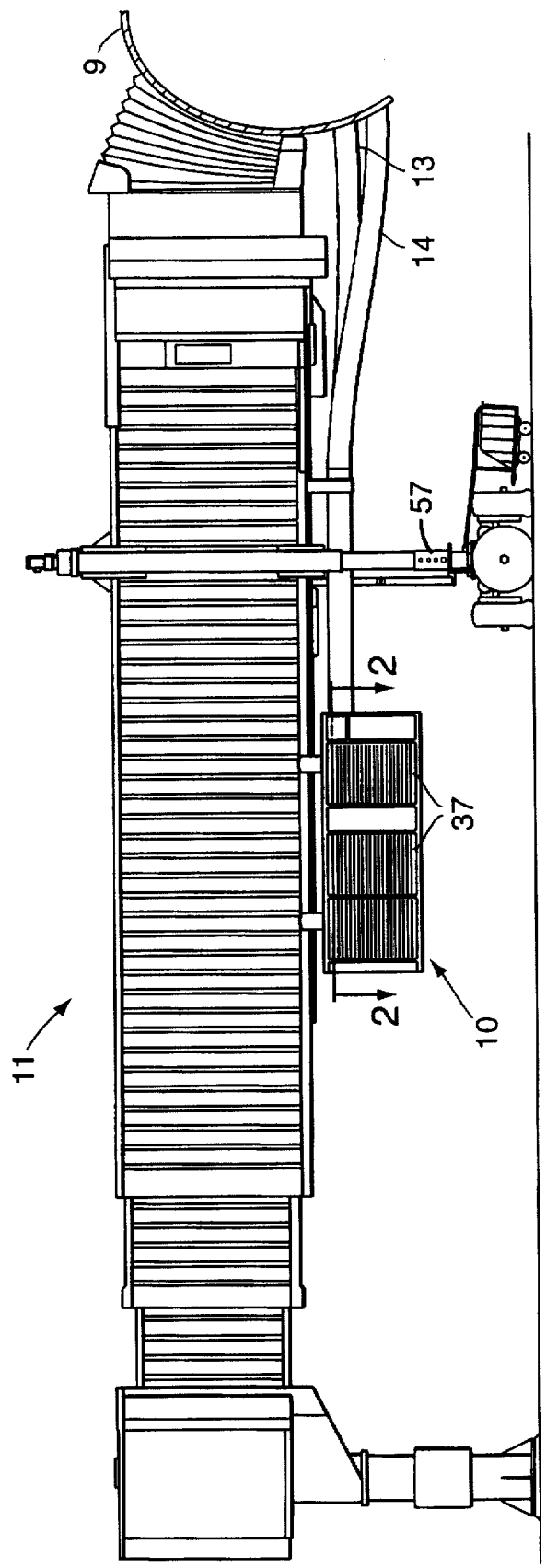
FIG. 1 is a side view of a preferred embodiment of the inventive air conditioning unit mounted on a passenger boarding bridge.

FIG. 1 is a side view of an air conditioning unit 10 mounted on a passenger boarding bridge 11.

Figure 2:
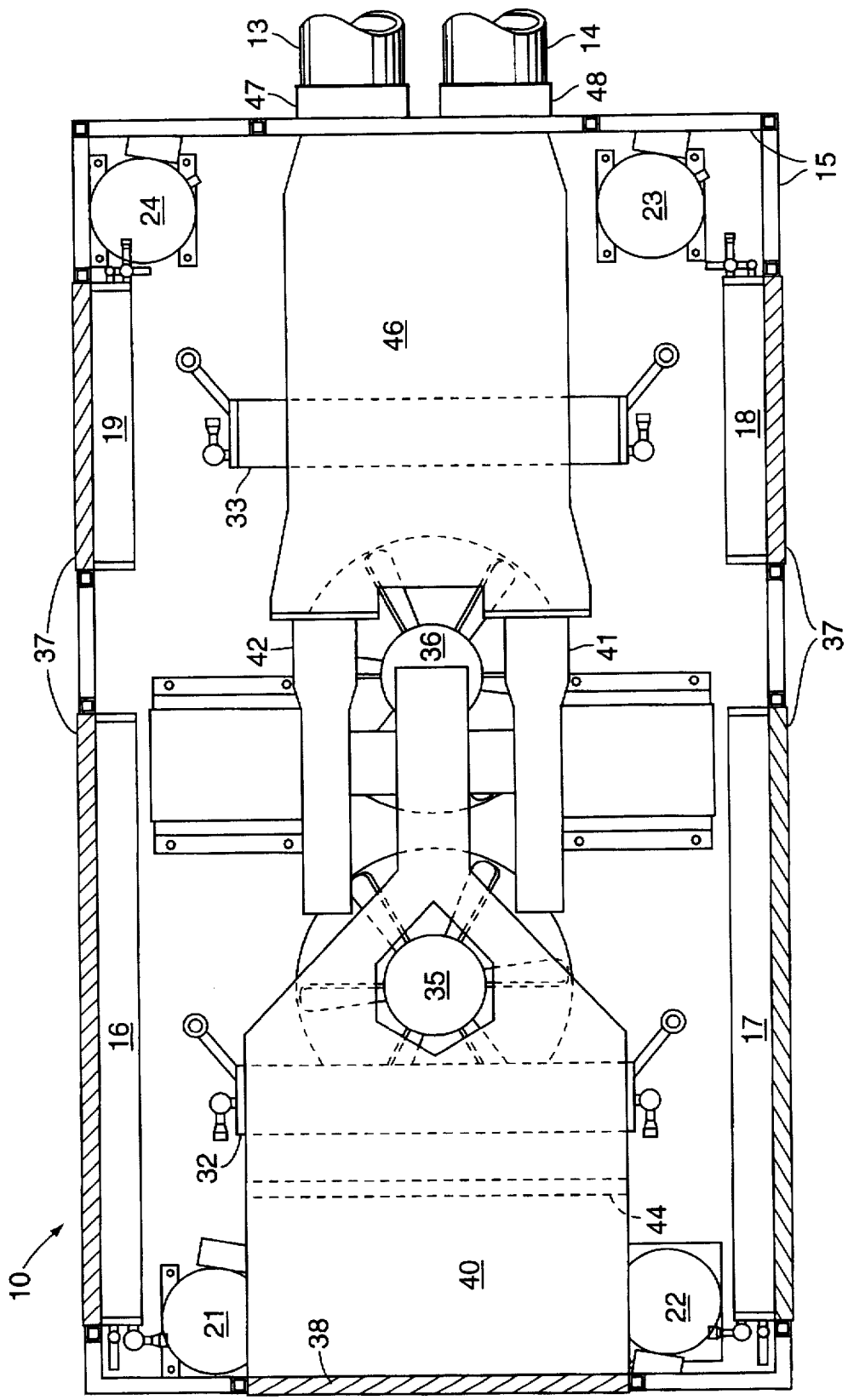
FIG. 2 is a cross sectional view of the air conditioning unit shown in FIG. 1 along line 2—2.
Figure 3:
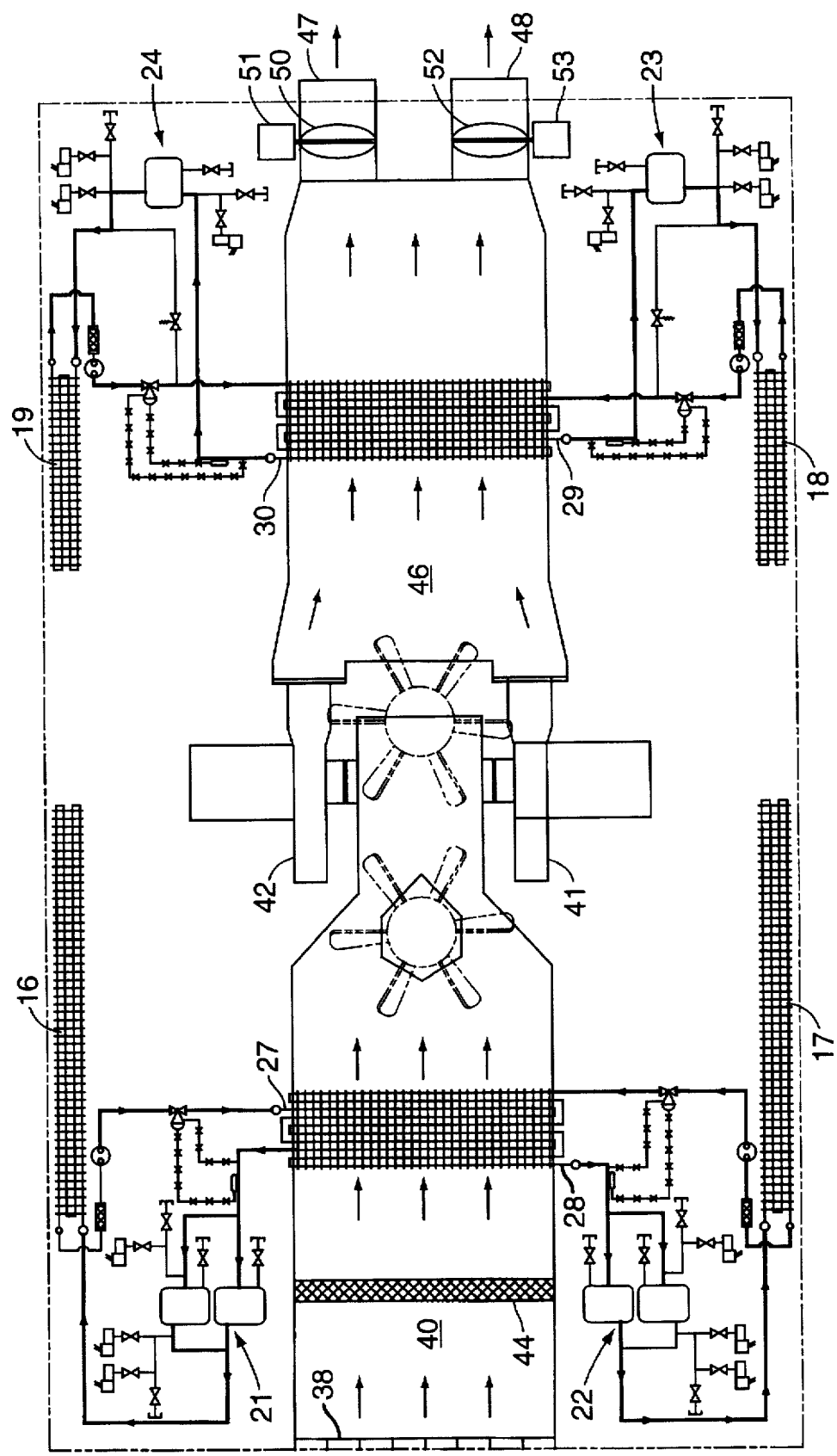
FIG. 3 is a schematic view of the air conditioning unit shown in FIG. 2.

FIG. 2 is a cross sectional view of the air conditioning unit 10 shown in FIG. 1, along lines 2—2. FIG. 3 is a schematic view of the air conditioning unit shown in FIG. 2. The air conditioning unit 10 has a frame 15. Mounted to the frame 15 is a first condenser coil 16, a second condenser coil 17, a third condenser coil 18, and a fourth condenser coil 19. A first compressor 21 is mounted to the frame 15 and in fluid connection to the first condenser coil 16. A second compressor 22 is mounted to the frame 15 and in fluid connection to the second condenser coil 17. A third compressor 23 is mounted to the frame 15 and in fluid connection to the third condenser coil 18. A fourth compressor 24 is mounted to the frame 15 and in fluid connection to the fourth condenser coil 19. The first and second compressors 21, 22 are connected together to form a primary compressor system. A first evaporator coil 27 is mounted to the frame 15 and is in fluid connection to the first condenser coil 16 and the first compressor 21. A second evaporator coil 28 is mounted to the frame 15 and is in fluid connection to the second condenser coil 17 and the second compressor 22. A third evaporator coil 29 is mounted to the frame 15 and is in fluid connection to the third condenser coil 18 and the third compressor 23. A fourth evaporator coil 30 is mounted to the frame 15 and is in fluid connection to the fourth condenser coil 19 and the fourth compressor 24. In this embodiment, the first and second evaporator coils 27, 28 form a primary evaporator coil 32. The third and fourth evaporator coils 29, 30 form a secondary evaporator coil 33. A first condenser fan 35 and a second condenser fan 36 are placed adjacent to condenser fan outlets in the air conditioning unit 10. Condenser air intakes 37 are placed adjacent to the first, second, third, and fourth condenser coils 16, 17, 18, 19.

An air inlet to the air conditioning unit 10 is covered by an inlet grill 38. A first chamber 40 is in fluid connection between the s inlet grill 38 and a first blower 41 and a second blower 42. The primary evaporator coil 32 extends across a cross section of the first chamber 40, so that air passing from the inlet grill 38 to the first and second blowers 41, 42 must pass through the primary evaporator coil 32. An air filter 44 extends across a cross section of the first chamber 40 between the inlet grill 38 and the primary evaporator coil 32, so that air passing from the inlet grill 38 to the primary evaporator coil 32 must pass through the air filter 44.

A second chamber 46 is in fluid connection between the first blower 41 and second blower 42 and a first outlet 47 and a second outlet 48. The secondary evaporator coil 33 extends across a cross section of the second chamber 46, so that air passing from the first and second blowers 41, 42 to the first and second outlets 47, 48 must pass through the secondary evaporator coil 33. Within the first outlet 47 is a first damper 50 controlled by a first damper motor 51. Within the second outlet 48 is a second damper 52 controlled by a second damper motor 53. A first hose 13 is connected to the first outlet 47. A second hose 14 is connected to the second outlet 48.

FIG. 4 is a magnified view of a remote control 57 on a column of a passenger boarding bridge 11, shown in FIG. 1, with the remote control switches electrically connected to the air conditioning unit 10. The remote control switches comprise a start switch 60, a stop switch, 61 and a mode selector switch 62.

In operation, the aircraft 9 taxis to a location adjacent to passenger boarding bridge 11, which moves to the aircraft 9. The first hose 13 is connected to a first outlet of the air conditioning unit 10 and a first coupling of the aircraft 9. If necessary the second hose 14 is connected to a second outlet of the air conditioning unit 10 and a second coupling of the aircraft 9. If the aircraft 9 is a narrow body or wide body aircraft, only the first hose 13 is connected to the aircraft 9. If the aircraft 9 is a jumbo body aircraft then both the first hose 13 and the second hose 14 are connected to the aircraft 9.

The air conditioning unit 10 is operated automatically after being turned on by the remote control 57. The mode selector switch 62 is turned to a position designating the type of aircraft 9 docked to the passenger boarding bridge 11, such as a narrow body, wide body, or jumbo body. The start switch 60 is selected. The first condenser fan 35 blows air out of the adjacent outlet, causing air to enter through the condenser air intakes 37. If additional cooling is desired, the second condenser fan 36 blows air out of the adjacent outlet, causing more air to enter through the condenser air intakes 37.

The first condenser coil 16 supplies a refrigerant to the first evaporator coil 27, where it evaporates. The refrigerant is then drawn into the first compressor 21, and then supplied to the first condenser coil 16. If additional cooling is desired, the second coil 17 supplies refrigerant to the second evaporator coil 28, where it evaporates. The refrigerant then passes to the second compressor 22 and then back to the condenser coil 17. If additional cooling is desired, the third condenser coil 18 supplies refrigerant to the third evaporator coil 29, where it evaporates. The refrigerant then passes to the third compressor 23 and then back to the third condenser coil 18. If additional cooling is desired, the fourth condenser coil 19 supplies refrigerant to the fourth evaporator coil 30, where it evaporates. The refrigerant then passes to the fourth compressor 24 and then back to the fourth condenser coil 19. The adding of cooling systems as needed to obtain the desired cooling, instead of cycling an entire cooling system on and off, provides a more efficient capacity control system.

Referring to the schematic illustration in FIG. 3 and to FIG. 2, if the mode selector switch 62 is set to a narrow body aircraft, then only the first blower 41 is activated and the first damper motor 51 opens the first damper 50, while the second damper motor 53 keeps the second damper 52 closed. The first blower 41 draws air in through the inlet grill to the first chamber 40, where it passes through the filter 44, where it is filtered, and the primary evaporator 32, where the air is cooled. The air passes through the first blower 41 to the second chamber 46 and through the secondary evaporator 33, where the air may be further cooled. The air then passes through only the first outlet 47, since the second damper 52 closes the second outlet 48. From the first outlet 47, the air passes through the first hose 13 and then to the aircraft 9.

If the mode selector switch 62 is set to a wide body aircraft, then the first blower 41 and second blower 42, being in parallel fluid connection with the first blower 41, are activated and the first damper motor 51 opens the first damper 50 while the second damper motor 53 keeps the second damper 52 closed. Only the first hose 13 is connected to the aircraft 9. The first blower 41 and the second blower 42 draw air in through the inlet grill 38 to the first chamber 40, where it passes through the filter 44, where it is filtered, and the primary evaporator 32, where the air is cooled. The air passes through the first blower 41 or the second blower 42 to the second chamber 46 and through the secondary evaporator 33, where the air may be further cooled. The air then passes through only the first outlet 47, since the second damper 52 closes the second outlet 48. From the first outlet 47, the air passes through the first hose 13 and then to the aircraft 9.

If the mode selector switch 62 is set to a jumbo body aircraft, then the first blower 41 and second blower 42 are activated and the first damper motor 51 opens the first damper 50 while the second damper motor 53 opens the second damper 52. Jumbo body aircraft have two connections, so both the first hose 13 and the second hose 14 are connected to the aircraft 9. The first blower 41 and the second blower 42 draw air in through the inlet grill 38 to the first chamber 40, where it passes through the filter 44, where it is filtered, and the primary evaporator 32, where the air is cooled. The air passes through the first blower 41 or the second blower 42 to the second chamber 46 and through the secondary evaporator 33, where the air may be further cooled. The air then passes through both the first outlet 47 and the second outlet 48. From the first outlet 47, the air passes through to the first hose 13 to the aircraft 9. From the second outlet 48, the air passes through the second hose 14 to the aircraft 9.

The use of two blowers in parallel fluid connection provides a simple and reliable control of the air flow versus static pressure performance in the systems where a significant variety of air flow rates within a relatively small range of static pressures is required. In addition, having two blowers provides a redundant system, so that some air is provided, even when a blower fails. The first chamber 40 and the second chamber 46 form an air passage way.

Other embodiments of the invention may add resistance heating or other types of heating across the first chamber or second chamber. Another embodiment may replace the cooling system with a reversible heat pump to provide both cooling and heating.

In another embodiment, for the control switches, a set of push buttons may be used to replace the start button and the mode selector switch. Instead, three buttons may be used with a push button to start the air conditioning unit for a narrow body, and a push button to start the air conditioning unit for a wide body, and another push button to start the air conditioning unit for a jumbo body.

While preferred embodiments of the present invention have been shown and described herein, it will be appreciated that various changes and modifications may be made therein without departing from the spirit of the invention as defined by the scope of the appended claims.

What is claimed is:

1. An apparatus for conditioning and piping air to an aircraft, comprising:

a first blower with an inlet and an outlet;

a second blower with an inlet and an outlet;

a first chamber connected to the inlet of the first blower and the inlet of the second blower;

a second chamber connected to the outlet of the first blower and the outlet of the second blower, wherein the first chamber and second chamber form an air passage way;

a hose for connecting the second chamber to an aircraft, connected to the second chamber; and means for activating the first blower alone and activating the first blower and the second blower together, electrically connected to the first blower and the second blower.

2. The apparatus, as recited in claim 1, further comprising:

a first outlet connected to the second chamber, wherein the hose is connected to the first outlet; and a second outlet connected to the second chamber.

3. The apparatus, as recited in claim 2, further comprising:

a first damper, located in the first outlet;

a first damper actuator, mechanically connected to the first damper;

a second damper, located in the second outlet; and a second damper actuator, mechanically connected to the second damper and electrically connected to the means for activating.

4. The apparatus, as recited in claim 3, wherein the means for activating the first blower alone and activating the first blower and the second blower together, comprises a switching system, with a first setting, a second setting, and a third setting.

5. The apparatus, as recited in claim 4, further comprising:

an evaporator coil in the air passage way;

a compressor in fluid connection with the evaporator coil; and a condenser coil in fluid connection with the compressor and the evaporator coil.

6. An apparatus for conditioning and piping air to an aircraft, comprising:

a first blower with an inlet and an outlet;

a second blower with an inlet and an outlet;

a first chamber connected to the inlet of the first blower and the inlet of the second blower:

a second chamber to the connected to the outlet of the first blower and the outlet of the second blower, wherein the first chamber and second chamber form an air passage way;

a first outlet connected to the second chamber;

a second outlet connected to the second chamber;

a first damper, located in the first outlet;

a first damper actuator, mechanically connected to the first damper;

a second damper, located in the second outlet;

a second damper actuator, mechanically connected to the second damper and electrically connected to the means for activating;

an evaporator coil in the air passage way;

a compressor in fluid connection with the evaporator coil;

a condenser coil in fluid connection with the compressor and the evaporator coil; and means for activating the first blower alone and activating the first blower and the second blower together, electrically connected to the first blower and the second blower, wherein the means for activating the first blower alone and activating the first blower and the second blower together, comprises a switching system, with a first setting, a second setting, and a third setting, wherein the first setting is for narrow body aircraft, the second setting is for wide body aircraft, and the third setting is for jumbo body aircraft.

7. A method for supplying air to an aircraft, comprising the steps of:

connecting a first hose to the aircraft;

connecting a second hose to the aircraft, if the aircraft has a second connecting coupling;

designating on a control panel whether the aircraft has a first designation a second designation, or a third designation;

activating a first blower;

activating a second blower if a the second or third designation was selected;

opening a damper leading to the second hose if third designation was selected; and closing the damper leading to the second hose if the first or second designation was selected.

8. The method, as recited in claim 7, further comprising the step of, cooling the air which passes through the first blower.

9. The method, as recited in claim 8, further comprising the step of heating the air which passes through the first blower.

10. The method, as recited in claim 9, wherein the first designation is for a narrow body aircraft, the second designation is for a wide body aircraft, and the third designation is for a jumbo body aircraft.

* * * * *